United States Patent
Qiu et al.

(10) Patent No.: US 10,571,155 B2
(45) Date of Patent: Feb. 25, 2020

(54) HIGH-TEMPERATURE LONG-SHAFT MOLTEN SALT PUMP DETECTION TESTBED

(71) Applicants: Xiaojuan Qiu, Jiangsu (CN); Zhefu Shi, Jiangsu (CN); Yanan Shen, Jiangsu (CN); Zhikuan Xue, Jiangsu (CN); Zhenhai Yue, Jiangsu (CN)

(72) Inventors: Xiaojuan Qiu, Jiangsu (CN); Zhefu Shi, Jiangsu (CN); Yanan Shen, Jiangsu (CN); Zhikuan Xue, Jiangsu (CN); Zhenhai Yue, Jiangsu (CN)

(73) Assignee: Changzhou Solar Molten Salt Pump Valve Technology Co., Ltd., Changzhou, Jiangsu (CN)

(*) Notice: Subject to any disclaimer, the term of this patent is extended or adjusted under 35 U.S.C. 154(b) by 0 days.

(21) Appl. No.: 16/019,553

(22) Filed: Jun. 27, 2018

(65) Prior Publication Data
US 2019/0234655 A1    Aug. 1, 2019

(30) Foreign Application Priority Data
Jan. 30, 2018 (CN) .......................... 2018 1 0088031

(51) Int. Cl.
| F04D 15/00 | (2006.01) |
| F04B 51/00 | (2006.01) |
| F24S 40/90 | (2018.01) |
| F28D 20/00 | (2006.01) |
| F24S 80/60 | (2018.01) |
| G01M 13/00 | (2019.01) |
| F03G 6/06  | (2006.01) |
| F24S 80/20 | (2018.01) |

(52) U.S. Cl.
CPC .............. *F24S 40/90* (2018.05); *F03G 6/067* (2013.01); *F04B 51/00* (2013.01); *F04D 15/00* (2013.01); *F24S 80/20* (2018.05); *F24S 80/60* (2018.05); *F28D 20/0034* (2013.01); *G01M 13/00* (2013.01); *F28D 2020/0047* (2013.01); *F28F 2265/16* (2013.01)

(58) Field of Classification Search
USPC ......................................................... 73/168
See application file for complete search history.

(56) References Cited

U.S. PATENT DOCUMENTS

| 7,316,765 B2* | 1/2008 | Tojo ........................ C25B 1/245 |
| | | 204/228.2 |
| 2013/0180520 A1* | 7/2013 | Raade ...................... C09K 5/12 |
| | | 126/714 |
| 2016/0363384 A1* | 12/2016 | Whitney ............. F28D 20/0034 |
| 2019/0170449 A1* | 6/2019 | Whitney ............... F28D 20/021 |

* cited by examiner

*Primary Examiner* — Andre J Allen

(57) ABSTRACT

A high-temperature long-shaft molten salt pump detection testbed, comprising: three pressure sensors, three electric shut-off valves, two flow sensors, two electric adjustments, and two temperature sensors, and also comprising a molten salt storage tank, a motor, a high-temperature long-shaft molten salt pump, a plurality of groups of insertion electric heaters, a first multipoint thermocouple, a second multipoint thermocouple, a preheating hole, a molten salt injection port, the test device can install a variety of models of molten salt pump, pipeline can use reducer to connect different types of molten salt pump, molten salt tank height can also meet the depth of different molten salt pump, a variety of models of molten salt pumps are used for tests, which are versatile and easy to use.

6 Claims, 1 Drawing Sheet

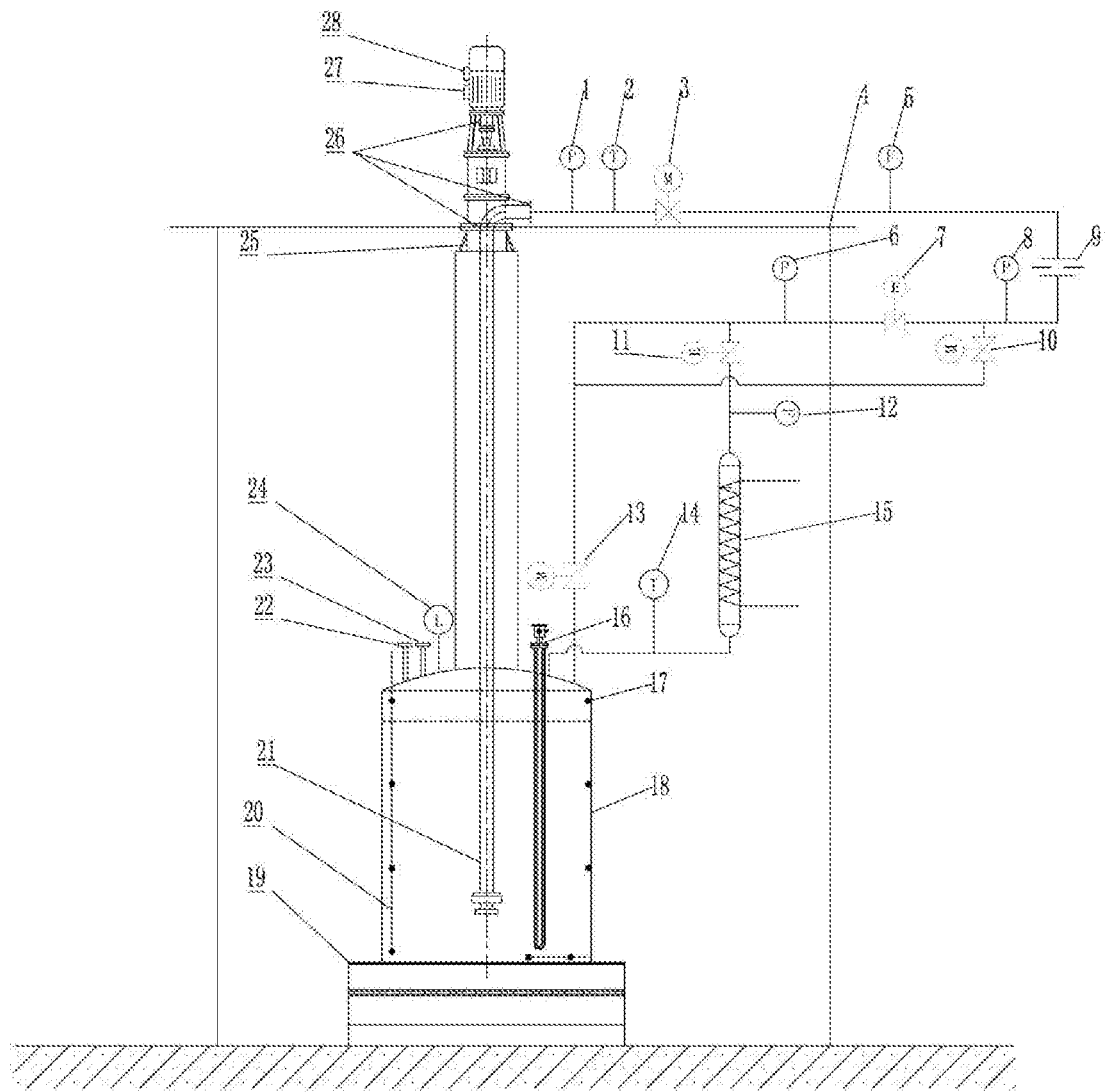

HIGH-TEMPERATURE LONG-SHAFT MOLTEN SALT PUMP DETECTION TESTBED

BACKGROUND OF THE INVENTION

1. Field of the Invention

The present invention relates to a high-temperature long-shaft molten salt pump detection testbed about the external characteristic, reliability and end-of-life detection device in solar thermal power system field, in particular, which is a high-temperature long-shaft molten salt pump detection testbed.

2. Description of the Related Art

With the continuous consumption of fossil fuels, the issue of sustainable energy use has become serious. In addition, the massive consumption of fossil fuels is gradually destroying the living environment of human beings and threatens the sustainable development of human society seriously. As a renewable green energy source, solar energy has the characteristics of continuous use. As a solar energy utilization method, solar thermal power generation can ensure the stable output of electricity, and has the ability of power peak shaving, and has broad application prospects.

At present, solar thermal power generation technologies that are more widely used include tower technology and trough technology, in which the medium used in heat storage system is mostly molten salt. To achieve the system heat exchange of power plants, high-temperature long-axis molten salt pumps are required to provide power to transfer heat by carrying molten salt.

The movement of medium in the high-temperature and long-axis molten salt pump is very complicated. At present, the design of the pump is still based on the experience from scientific experiment and production practice, or semi-theory and semi-empirical method. Therefore, the performance testing of the high temperature long axis molten salt pump is of great significance for the design, production, use and improvement of the pump. It can not only provide detailed and reliable data as a technical basis for the improvement and production of the pump, but also the high temperature long axis molten salt pump. Theoretical research and development and the innovation of design methods have an indispensable role.

High-temperature long-axis molten salt pumps have high operating temperatures (at least 300° C.) and long shafts (more than 10 meters). It is extremely difficult to perform various performance tests, and there are few related studies. At present, there is no testbed for this type of molten salt pump performance test. The detection of molten salt pumps use clean water to test the performance of the pump, and it is impossible to detect various performances of such molten salt pumps in high-temperature molten salt mediums. The reliability and life of the operation of the molten salt pumps in solar thermal power stations are very high. It is difficult to make an accurate assessment. Therefore, there is a need for a high-temperature, long-axis molten salt pump performance testbed to perform various performance tests for high-temperature long-axis molten salt pumps. It is not only necessary to accurately measure the parameters of the pump in a high-temperature environment, but also to ensure the safety of the entire apparatus under high-temperature conditions.

SUMMARY OF THE INVENTION

The present invention has been made to solve the foregoing problems and it is therefore an object of the present invention to provide a high-temperature long-shaft molten salt pump detection testbed.

According to an aspect of the invention to obtain the above objects, it is provided a high-temperature long-shaft molten salt pump detection testbed comprising: a molten salt storage tank and a motor, wherein a high-temperature long-shaft molten salt pump connected to a molten salt pipeline is arranged at the top of the molten salt storage tank; a first pressure sensor, a first temperature sensor, a first electric check valve, a first flow sensor, a hole plate, a second pressure sensor, a first electric regulating valve and a third pressure sensor are successively connected to the molten salt pipeline; the molten salt pipeline in rear of the third pressure sensor is divided into two branches, one of which is connected to the molten salt storage tank via a second electric check valve and the other of which is connected to the molten salt storage tank via a second electric regulating valve, a second flow sensor, a heat exchanger and a second temperature sensor successively; a branch connected to a third electric check valve is arranged between the pipeline at the rear side of the second pressure sensor and the pipeline at the front side of the second electric check valve; a plurality of groups of insertion electric heaters for guaranteeing the temperature of molten salt in the tank are accessed to the surface of a seal head of the molten salt storage tank; a first multipoint thermocouple and a second multipoint thermocouple for monitoring the temperature of the molten salt are connected in the molten salt storage tank; a liquid level meter hole connected to a liquid level meter through a flange, a preheating hole connected to a hot blast stove equipment through a flange, a molten salt injection port connected to a salt dissolving equipment pipeline through a flange and a spare hole for facilitating other operations are formed on the surface of the seal head of the molten salt storage tank; the high-temperature long-shaft molten salt pump is arranged on a transition plate connected to a steel structure through a mounting base plate; the molten salt storage tank is connected to an expansion joint through a lower flange of the expansion joint, and an upper flange of the expansion joint is connected to the transition plate; a motor bearing seat of the motor is arranged above the mounting base plate, vibration monitoring devices are arranged at the mounting base plate of the high-temperature long-shaft molten salt pump, a discharge flange joint and the motor bearing base; a power analyzer interface and a photoelectric speed sensor for monitoring a motor speed are connected to the motor; and the photoelectric speed sensor, the three pressure sensors, the three electric check valves, the two flow sensors, the two electric regulating valves, the two temperature sensors, the liquid level meter, the two groups of multipoint thermocouples and the vibration monitoring device are connected to a controller, and accessed to a distributed control system (DCS).

In the invention as above, a double-layer insulating layer made of aluminum silicate fiber and rock wool is covered on the surface of the molten salt storage tank, and an insulating foundation is connected to the bottom of the molten salt storage tank; the aluminum silicate fiber insulating layer for reducing heat loss is covered on the surfaces of the pipeline, the first electric check valve, the first electric regulating valve, the third electric check valve, the second electric regulating valve and the second electric check valve, and heating tapes for preventing molten salt from coagulation and guaranteeing uniform temperature distribution of the pipeline are wound on the surfaces thereof; and the insulating layer is arranged around the expansion joint.

In the invention as above, the mounting structure of the molten salt pipeline is an inclined mounting structure capable of guaranteeing that all molten salt in the pipeline flows back to the molten salt storage tank after the test; a support is arranged below the pipeline; and the hole plate, the first electric check valve, the first electric regulating valve, the third electric check valve, the second electric regulating valve, the second electric check valve and the heat exchanger are in welded connection with the pipeline.

In the invention as above, the first flow sensor and the second flow sensor are an ultrasonic flow sensor; and a straight pipe section having a length more than 10 times the pipeline diameter is connected to the front of the ultrasonic flow sensor, and a straight pipe section having a length more than 5 times the pipeline diameter is connected to the rear thereof.

In the invention as above, the molten salt pipeline is flexibly designed, and an expansion joint buffer for preventing thermal deformation is arranged in front of an elbow of the molten salt pipeline.

In the invention as above, an inclination angle in the inclined mounting structure is five degrees.

The photoelectric speed sensor, three pressure sensors, three electric cut-off valves, two flow sensors, two electric control valves, two temperature sensors, liquid level gauges, two sets of multi-point thermocouples, and vibration monitoring devices Connected to the controller and connected to the DCS system. The parameters are detected, collected, stored and calculated according to the relevant formulas such as flow, head, efficiency, shaft power, vibration acceleration and other parameters. The test data can be output through the peripheral equipment.

The high-temperature long-axis molten salt pump is equipped with a vibration monitoring device at the installation bottom plate, at the outlet flange connection, and at the motor bearing block, and then it is connected to a distributed control system (DCS) to monitor the high-temperature long-axis molten salt pump and the motor. The vibration conditions; At the same time in the motor with photoelectric speed sensor, used to monitor the motor speed; high-temperature long-axis molten salt pump shaft power through the electrical measurement method, the motor connected to the power analyzer interface, using a computer to record the motor current And voltage, the shaft power of the pump is calculated.

The inlet pressure of the high-temperature long-axis molten salt pump can be obtained by converting the height of the liquid level detected by the liquid level gauge minus the height obtained after the distance between the pump inlet and the bottom of the tank; the pressure at the pump outlet can be measured by the first pressure sensor on the pump outlet pipeline. The value is obtained by adding the value obtained by converting the height of the pressure sensor from the height of the pump outlet.

The beneficial effects of the present invention as follows: The molten salt can be directly used as a medium to simulate the performance of the long-axis high-temperature molten salt pump under various working conditions of the power station, the simulation effect is true, and the error caused by the performance of the pump is avoided by using the test conversion of water. The entire test rig adopts a reliable heat preservation structure, reduces the loss of molten salt heat, resists high temperatures, and has anti-burning effect. At the same time, the entire molten salt pipeline is installed obliquely to effectively ensure the molten salt flow in the pipeline after the end of the test. The back molten salt storage tank is safe and reliable to use; the whole test device is designed according to the fatigue durability requirements, and has the capability of testing the fatigue life test of high-temperature long-axis molten salt pumps; the design of the testbed is based on various long-axis high-temperature molten salt pumps. The test device can install a variety of models of molten salt pump, pipeline can use reducer to connect different types of molten salt pump, molten salt tank height can also meet the depth of different molten salt pump, a variety of models of molten salt pumps are used for tests, which are versatile and easy to use.

BRIEF DESCRIPTION OF THE DRAWINGS

The above and other objects, features and other advantages of the present invention will be more clearly understood from the following details description taken in conjunction with the accompanying drawings, in which:

FIG. 1 is a schematic diagram showing the structure of the present invention.

DETAILED DESCRIPTION OF THE PREFERRED EMBODIMENT

The following detailed description will present a preferred embodiment of the invention in reference to the accompanying drawings.

To overcome the foregoing problems and it is therefore an object of the present invention to provide a high-temperature long-shaft molten salt pump detection testbed.

Referring to FIG. 1, a high-temperature long-shaft molten salt pump detection testbed, comprising a molten salt storage tank 18 and a motor, wherein a high-temperature long-shaft molten salt pump 21 connected to a molten salt pipeline is arranged at the top of the molten salt storage tank 18; a first pressure sensor 1, a first temperature sensor 2, a first electric check valve 3, a first flow sensor 5, a hole plate 9, a second pressure sensor 8, a first electric regulating valve 7 and a third pressure sensor 6 are successively connected to the molten salt pipeline; the molten salt pipeline in rear of the third pressure sensor 6 is divided into two branches, one of which is connected to the molten salt storage tank 18 via a second electric check valve 13 and the other of which is connected to the molten salt storage tank 18 via a second electric regulating valve 11, a second flow sensor 12, a heat exchanger 15 and a second temperature sensor 14 successively; a branch connected to a third electric check valve 10 is arranged between the pipeline at the rear side of the second pressure sensor 8 and the pipeline at the front side of the second electric check valve 13; a plurality of groups of insertion electric heaters 16 for guaranteeing the temperature of molten salt in the tank are accessed to the surface of a seal head of the molten salt storage tank 18; a first multipoint thermocouple 17 and a second multipoint thermocouple 20 for monitoring the temperature of the molten salt are connected in the molten salt storage tank 18; a liquid level meter hole connected to a liquid level meter 24 through a flange, a preheating hole 22 connected to a hot blast stove equipment through a flange, a molten salt injection port 23 connected to a salt dissolving equipment pipeline through a flange and a spare hole for facilitating other operations are formed on the surface of the seal head of the molten salt storage tank 18; the high-temperature long-shaft molten salt pump 21 is arranged on a transition plate connected to a steel structure 4 through a mounting base plate; the molten salt storage tank 18 is connected to an expansion joint 25 through a lower flange of the expansion joint, and an upper flange of the expansion joint is connected to the transition plate; a motor bearing seat of the motor is arranged above the mounting base plate, vibration monitoring devices are arranged at the mounting base plate of the high-temperature long-shaft molten salt pump 21, a discharge flange joint and the motor bearing base; a power analyzer interface 27 and a photoelectric speed sensor 28 for monitoring a motor speed are connected to the motor; and the photoelectric speed sensor 28, the three pressure sensors, the three electric check valves, the two flow sensors, the two electric regulating valves, the two temperature sensors, the liquid level meter 24, the two groups of multipoint thermocouples and the vibration monitoring device 26 are connected to a controller, and accessed to a distributed control system (DCS); a double-layer insulating layer made of aluminum silicate fiber and rock wool is covered on the surface of the molten salt storage tank 18, and an insulating foundation 19 is connected to the bottom of the molten salt storage tank 18; the aluminum silicate fiber insulating layer for reducing heat loss is covered on the surfaces of the pipeline, the first electric check valve 3, the first electric regulating valve 7, the third electric check valve 10, the second electric regulating valve 11 and the second electric check valve 13, and heating tapes for preventing molten salt from coagulation and guaranteeing uniform temperature distribution of the pipeline are wound on the surfaces thereof; and the insulating layer is arranged around the expansion joint 25; the mounting structure of the molten salt pipeline is an inclined mounting structure capable of guaranteeing that all molten salt in the pipeline flows back to the molten salt storage tank 18 after the test; a support is arranged below the pipeline; and the hole plate 9, the first electric check valve 3, the first electric regulating valve 7, the third electric check valve 10, the second electric regulating valve 11, the second electric check valve 13 and the heat exchanger 15 are in welded connection with the pipeline; the first flow sensor 5 and the second flow sensor 12 are an ultrasonic flow sensor; and a straight pipe section having a length more than ten times the pipeline diameter is connected to the front of the ultrasonic flow sensor, and a straight pipe section having a length more than five times the pipeline diameter is connected to the rear thereof; the molten salt pipeline is flexibly designed, and an expansion joint buffer for preventing thermal deformation is arranged in front of an elbow of the molten salt pipeline; an inclination angle in the inclined mounting structure is five degrees.

The beneficial effects of the present invention as follows: the molten salt can be directly used as a medium to simulate the performance of the long-axis high-temperature molten salt pump under various working conditions of the power station, the simulation effect is true, and the error caused by the performance of the pump is avoided by using the test conversion of water. The entire test rig adopts a reliable heat preservation structure, reduces the loss of molten salt heat, resists high temperatures, and has anti-burning effect. At the same time, the entire molten salt pipeline is installed obliquely to effectively ensure the molten salt flow in the pipeline after the end of the test. The back molten salt storage tank is safe and reliable

What is claimed is:

1. A high-temperature long-shaft molten salt pump detection testbed, comprising a molten salt storage tank and a motor, wherein a high-temperature long-shaft molten salt pump connected to a molten salt pipeline is arranged at the top of the molten salt storage tank; a first pressure sensor, a first temperature sensor, a first electric check valve, a first flow sensor, a hole plate, a second pressure sensor, a first electric regulating valve and a third pressure sensor are successively connected to the molten salt pipeline; the molten salt pipeline in rear of the third pressure sensor is divided into two branches, one of which is connected to the molten salt storage tank via a second electric check valve and the other of which is connected to the molten salt storage tank via a second electric regulating valve, a second flow sensor, a heat exchanger and a second temperature sensor successively; a branch connected to a third electric check valve is arranged between the pipeline at the rear side of the second pressure sensor and the pipeline at the front side of the second electric check valve; a plurality of groups of insertion electric heaters for guaranteeing the temperature of molten salt in the tank are accessed to the surface of a seal head of the molten salt storage tank; a first multipoint thermocouple and a second multipoint thermocouple for monitoring the temperature of the molten salt are connected in the molten salt storage tank; a liquid level meter hole connected to a liquid level meter through a flange, a preheating hole connected to a hot blast stove equipment through another flange, a molten salt injection port connected to a salt dissolving equipment pipeline through third flange and a spare hole for facilitating other operations are formed on the surface of the seal head of the molten salt storage tank; the high-temperature long-shaft molten salt pump is arranged on a transition plate connected to a steel structure through a mounting base plate; the molten salt storage tank is connected to an expansion joint through a lower flange of the expansion joint, and an upper flange of the expansion joint is connected to the transition plate; a motor bearing seat of the motor is arranged above the mounting base plate, vibration monitoring devices are arranged at the mounting base plate of the high-temperature long-shaft molten salt pump, a discharge flange joint and the motor bearing base; a power analyzer interface and a photoelectric speed sensor for monitoring a motor speed are connected to the motor; and the photoelectric speed sensor, the three pressure sensors, the three electric check valves, the two flow sensors, the two electric regulating valves, the two temperature sensors, the liquid level meter, the two groups of multipoint thermocouples and the vibration monitoring device are connected to a controller, and accessed to a distributed control system.

2. A high-temperature long-shaft molten salt pump detection testbed in accordance with claim 1, wherein a double-layer insulating layer made of aluminum silicate fiber and rock wool is covered on the surface of the molten salt storage tank, and an insulating foundation is connected to the bottom of the molten salt storage tank; the aluminum silicate fiber insulating layer for reducing heat loss is covered on the surfaces of the pipeline, the first electric check valve, the first electric regulating valve, the third electric check valve, the second electric regulating valve and the second electric check valve, and heating tapes for preventing molten salt from coagulation and guaranteeing uniform temperature distribution of the pipeline are wound on the surfaces thereof; and the insulating layer is arranged around the expansion joint.

3. A high-temperature long-shaft molten salt pump detection testbed in accordance with claim 1, wherein the mounting structure of the molten salt pipeline is an inclined mounting structure capable of guaranteeing that all molten salt in the pipeline flows back to the molten salt storage tank after the test; a support is arranged below the pipeline; and the hole plate, the first electric check valve, the first electric regulating valve, the third electric check valve, the second electric regulating valve, the second electric check valve and the heat exchanger are in welded connection with the pipeline.

4. A high-temperature long-shaft molten salt pump detection testbed in accordance with claim 1, wherein the first flow sensor and the second flow sensor are an ultrasonic flow sensor; and a straight pipe section having a length more than ten times the pipeline diameter is connected to the front of the ultrasonic flow sensor, and a straight pipe section having a length more than five times the pipeline diameter is connected to the rear thereof.

5. A high-temperature long-shaft molten salt pump detection testbed in accordance with claim 4, wherein the molten salt pipeline is flexibly designed, and an expansion joint buffer for preventing thermal deformation is arranged in front of an elbow of the molten salt pipeline.

6. A high-temperature long-shaft molten salt pump detection testbed in accordance with claim 3, wherein an inclination angle in the inclined mounting structure is five degrees.

\* \* \* \* \*